United States Patent [19]

Tanabe et al.

[11] Patent Number: 5,076,380
[45] Date of Patent: Dec. 31, 1991

[54] APPARATUS FOR CONTROLLING THE DISTRIBUTION OF DRIVE POWER IN MOTOR VEHICLE

[75] Inventors: Hidetoshi Tanabe; Shoji Tokushima, both of Tochigi, Japan

[73] Assignee: Honda Giken Kogyo Kabushiki Kaisha, Tokyo, Japan

[21] Appl. No.: 423,305

[22] Filed: Oct. 18, 1989

[30] Foreign Application Priority Data

Oct. 19, 1988 [JP] Japan ............................ 63-263509

[51] Int. Cl.⁵ ............................................ B62D 11/08
[52] U.S. Cl. ..................................... 180/6.3; 60/494; 91/523; 192/49; 192/87.13
[58] Field of Search ..................... 180/6.2, 6.3; 192/49, 192/87.13, 87.18; 74/650; 60/494; 91/523

[56] References Cited

U.S. PATENT DOCUMENTS

| 3,437,187 | 4/1969 | Umeda et al. ......................... 192/49 |
| 3,946,560 | 3/1976 | Mac Intosh et al. ................. 180/6.3 |
| 4,307,796 | 12/1981 | Hakes et al. ....................... 192/87.13 |
| 4,681,180 | 7/1987 | Oyama et al. ......................... 180/76 |
| 4,790,404 | 12/1988 | Naito ................................... 180/197 |

FOREIGN PATENT DOCUMENTS

| 8705574 | 9/1987 | PCT Int'l Appl. ................... 180/6.3 |
| 2135256 | 8/1984 | United Kingdom ................ 180/6.3 |

Primary Examiner—Kenneth R. Rice
Assistant Examiner—Mitchell Bompey
Attorney, Agent, or Firm—Armstrong, Nikaido, Marmelstein, Kubovcik & Murray

[57] ABSTRACT

An apparatus for controlling the distribution of drive power in a motor vehicle includes a pair of pressure regulating valves, a pair of regulated pressure passages interconnecting the pressure regulating valves, respectively, and torque transmission clutches which transmit drive power to a pair of drive wheels, and a shut-off valve mechanism disposed between the regulated pressure passages for selectively bringing the regulated pressure passages into and out of each other.

7 Claims, 4 Drawing Sheets

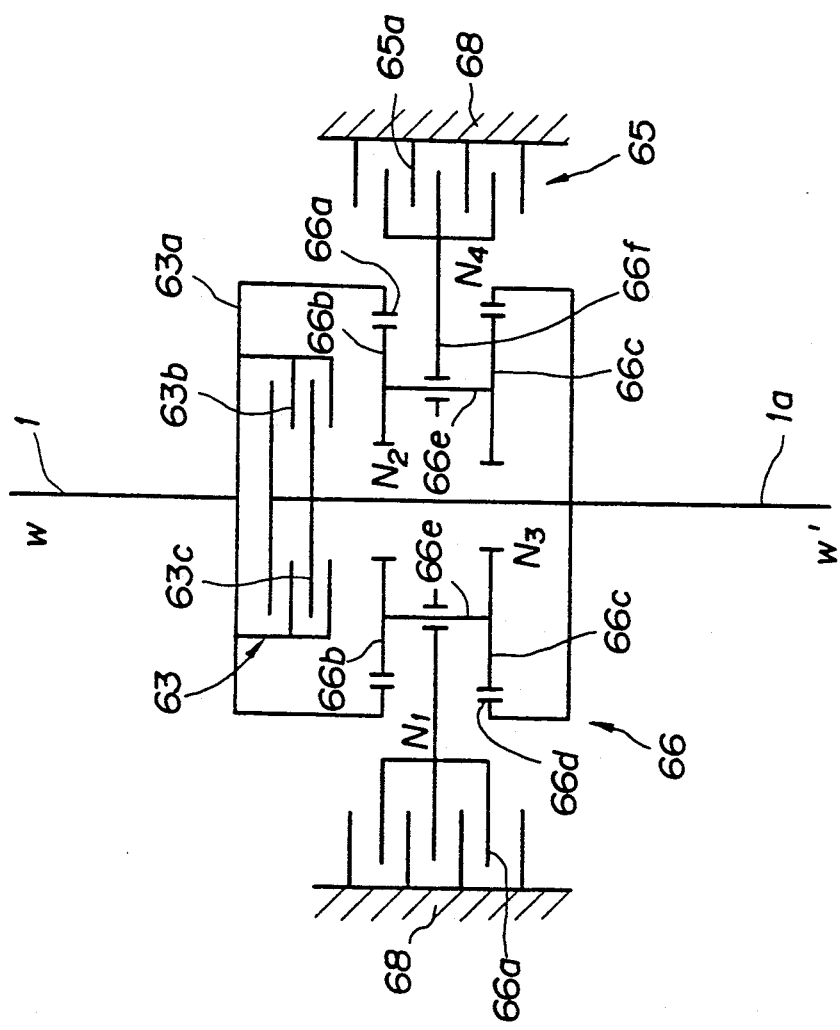

APPARATUS FOR CONTROLLING THE DISTRIBUTION OF DRIVE POWER IN MOTOR VEHICLE

BACKGROUND OF THE INVENTION

1. Field of the Invention

The present invention relates to an apparatus for controlling the distribution of driver power in a motor vehicle which has a pair of torque transmission clutches for varying the torques to be transmitted to respective drive wheels.

2. Description of the Relevant Art

There is known a drive power distribution control apparatus which includes, instead of a mechanical differential, torque transmission clutches such as hydraulically operated multiple-disc clutches for varying the torques to be transmitted a pair of laterally spaced rear drive wheels of a motor vehicle.

When the motor vehicle with such a drive power distribution control apparatus is running straight, it is necessary to apply a uniform hydraulic pressure to the torque transmission clutches for the drive wheels in order to transmit equal torques from a power source such as an engine to the drive wheels. Therefore, pressure regulating valves disposed in respective regulated pressure passages leading to the torque transmission clutches are required to be machined with high precision. Actually, however, it is highly difficult to machine the pressure regulating valves with a required degree of precision. As a result, it is actually difficult to apply equal hydraulic pressures to the torque transmission clutches, and hence the torque generated by the power source cannot efficiently be transmitted to the rear drive wheels.

The present invention has been made in an effort to effectively solve the aforesaid problems of the conventional drive power distribution control apparatus.

SUMMARY OF THE INVENTION

It is an object of the present invention to provide a drive power distribution control apparatus for a motor vehicle, which allows a uniform hydraulic pressure to be reliably transmitted to torque transmission clutches for a pair of laterally spaced drive wheels of the motor vehicle when the motor vehicle is running straight, so that the torque from a drive source of the motor vehicle can efficiently be transmitted to the drive wheels.

According to the present invention, there is provided an apparatus for controlling the distribution of drive power in a motor vehicle having a torque transmission device which transmits power from a power source to a pair of drive wheels through respective torque transmission clutches capable of varying torques transmitted therethrough, the apparatus comprising a pair of pressure regulating valves, a pair of regulated pressure passages extending from the pressure regulating valves, respectively, to the torque transmission clutches, and shut-off valve means disposed between the regulated pressure passages for selectively bringing the regulated pressure passages into and out of commication with each other.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 5 is a schematic view of a planetary gear transmission capable of increasing the rotational speed of an input shaft thereof, the planetary gear transmission being mounted on a motor vehicle which is equipped with the drive power distribution control apparatus shown in FIG. 4.

DETAILED DESCRIPTION OF THE PREFERRED EMBODIMENTS

Figure 1:
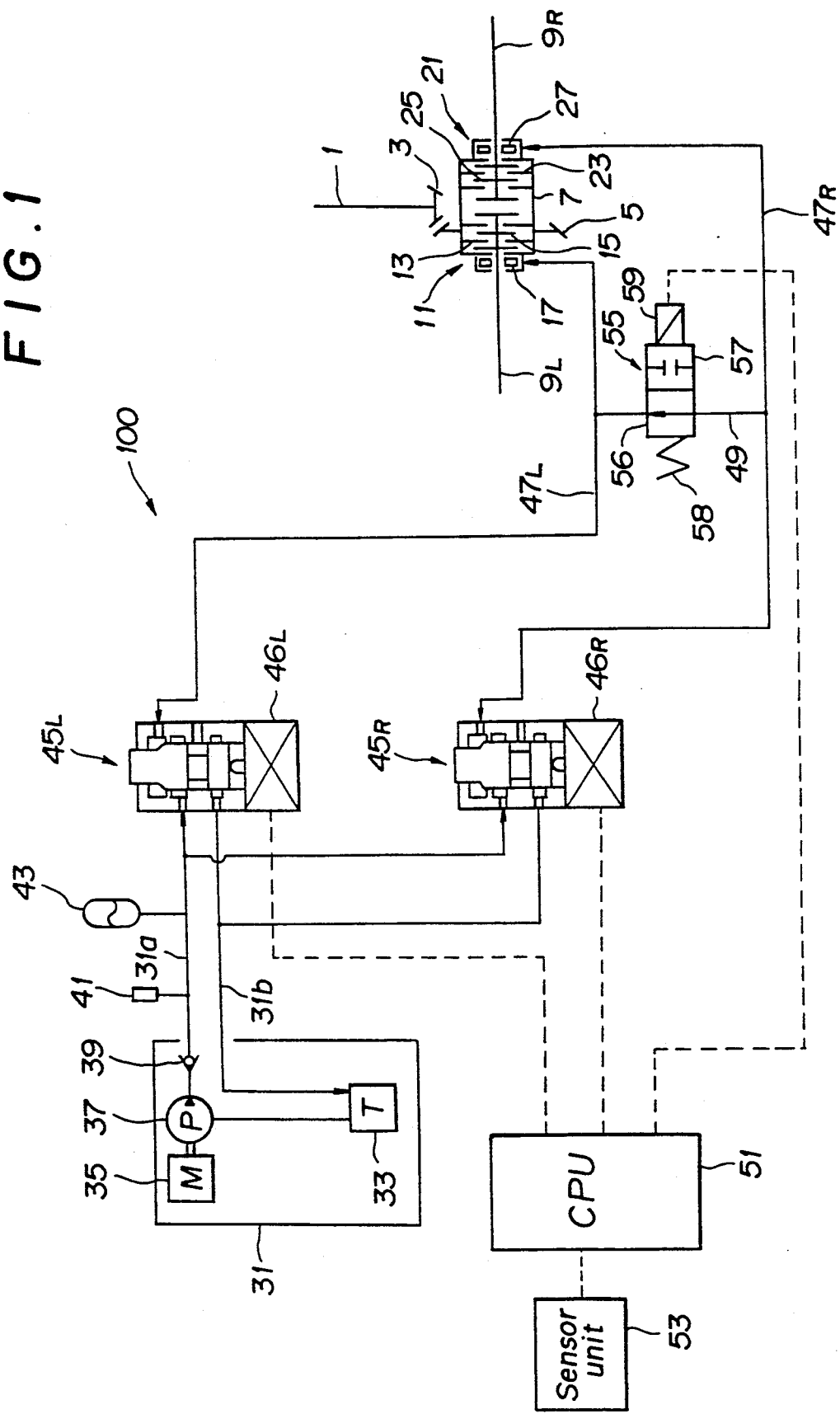
FIG. 1 is a circuit diagram of a hydraulic pressure system of a drive power distribution control apparatus according to a first embodiment of the present invention.

FIG. 1 shows a drive power distribution control apparatus, generally designated by the reference numeral 100, for use on a motor vehicle. The drive power distribution control apparatus 100 serves to control the ratio of drive powers to be distributed from an engine (not shown) and a transmission (not shown) on the motor vehicle through a propeller shaft 1 to a pair of torque transmission clutches 11, 21 disposed in a differential case 7. A bevel gear 3 mounted on the rear end of the propeller shaft 1 is held in mesh with a bevel gear 5 integrally mounted on an outer casing wall of the case 7, so that the torque from the propeller shaft 1 can be transmitted to the differential case 7 at all times. The torque thus applied to the differential case 7 is then transmitted through the torque transmission clutches 11, 21 to respective drive axles 9L, 9R coupled to rear drive wheels.

Each of the torque transmission clutches 11, 21 comprises a hydraulically operated multiple-disc clutch, for example, as shown in FIG. 1. More specifically, the lefthand torque transmission clutch 11 (as shown in FIG. 1) comprises a plurality of outer plates 13 fixedly mounted in a lefthand portion of the differential case 7, a plurality of inner plates 15 fixedly mounted on the lefthand drive axle 9L, the outer and inner plates 13, 15 interleaving with each other, and a cylinder 17 for applying a hydraulic pressure to press the outer plates 13 and the inner plates 15 against each other. The righthand torque transmission clutch 11 comprises a plurality of outer plates 23 fixedly mounted in a righthand portion of the differential case 7, a plurality of inner plates 25 fixedly mounted on the righthand drive axle 9R, and a cylinder 27 for applying a hydraulic pressure to press the outer plates 23 and the inner plates 25 against each other. The cylinders 17, 27 can be operated independently of each other, so that different torques can be transmitted through the torque transmission clutches 11, 21 to the drive axles 9L, 9R.

The drive power distribution control apparatus 100 further includes a hydraulic pressure source 31 comprising a tank 33, a motor 35 drivalbe by the engine on the motor vehicle, a pump 37 actuatable by the motor 35 for supplying oil from the tank 33, and a check valve 39 for allowing oil to flow only from the pump 37. The hydraulic pressure source 31 has an output line 31a to which a hydraulic pressure switch 41 and accumulator 43 are connected. The output line 31a has parallel branch lines connected to respective pressure regulating valves 45L, 45R. The pressure regulating valve 45L is connected through a regulated pressure passage (oil passage) 47L to the cylinder 17 of the lefthand torque transmission clutch 11, for supplying a regulated hydraulic pressure to the cylinder 17. The pressure regulating valve 45R is connected through a regulated pressure passage (oil passage) 47R to the cylinder 27 of the righthand torque transmission clutch 21, for supplying a regulated hydraulic pressure to the cylinder 27. The pressure regulating valves 45L, 45R are connected to the tank 33 of the hydraulic pressure source 31 through a return oil passage 31b.

The pressure regulating valves 45L, 45R have respective solenoids 46L, 46R which can be energized and deenergized under the control of a computer 51. The computer 51 controls the solenoids 46L, 46R depending on detected signals from a sensor unit 53 which detects a front wheel steered angle θf, a vehicle speed V, and other parameters, for thereby supplying regulated hydraulic pressures to the regulated pressure passages 47L, 47R. The forces with which the torque transmission clutches 11, 21 are engaged are controlled by the pressures supplied from the oil passages 47L, 47R.

More specifically, the computer 51 controls the solenoids 46L, 46R such that when the motor vehicle is turning at a low speed, more drive power is transmitted to the outer drive wheel with respect to the turning circle than to the inner drive wheel for increased turning performance, and when the motor vehicle is turning at a high speed, more drive power is transmitted to the inner drive wheel than to the outer drive wheel for increased motor vehicle stability.

The drive power distribution control apparatus 100 includes a bypass oil passage 49 interconnecting the regulated lated pressure passages 47L, 47R and having a normally open two-position shut-off valve mechanism 55. The shut-off valve mechanism 55 has a valve comprising a communication member 56 and a shut-off member 57 which are selectively shiftable into registry with the bypass oil passage 49. The shut-off valve mechanism 55 also has a spring 58 for normally urging the valve in a direction to bring the communication member 56 into registry with the bypass oil passage 49, and a solenoid 59 which, when energized, biases the valve in the opposite direction to position the shut-off member 57 into registry with the bypass oil passage 49.

When the motor vehicle is making a turn, the computer 51 energizes the solenoid 59 to close the bypass oil passage 49 with the shut-off valve mechanism 49. Under this condition, the computer 51 controls the torques to be transmitted to the rear drive wheels independently of each other.

While the motor vehicle is running straight ahead, the computer 51 de-energizes the solenoid 59, and the valve mechanism 55 opens the bypass oil passage 49. Since the regulated pressure passages 47L, 47R communicate with each other at this time, the hydraulic pressures applied to the cylinders 17, 27 of the torque transmission clutches 11, 21 are uniformized. As a consequence, the torque transmitted from the power source to the propeller shaft 1 is efficiently transmitted through the clutches 11, 21 to the rear drive wheels.

In the illustrated arrangement, the regulated pressure passages 47L, 47R leading to the respective torque transmission clutches 11, 21 are connected to each other by the bypass oil passage 49, which is selectively openable and closable by the two-position valve mechanism 55. Therefore, even if the hydraulic pressures in the regulated pressure passages 47L, 47R are slightly different from each other, the hydraulic pressures in the passages 47L, 47R can reliably be equalized when the valve mechanism 55 is opened. Consequently, no high precision is required in machining the pressure regulating valves 45L, 45R. The valve mechanism 55 may be simple and inexpensive as it only selectively opens and closes the bypass oil passage 49.

Figure 2:
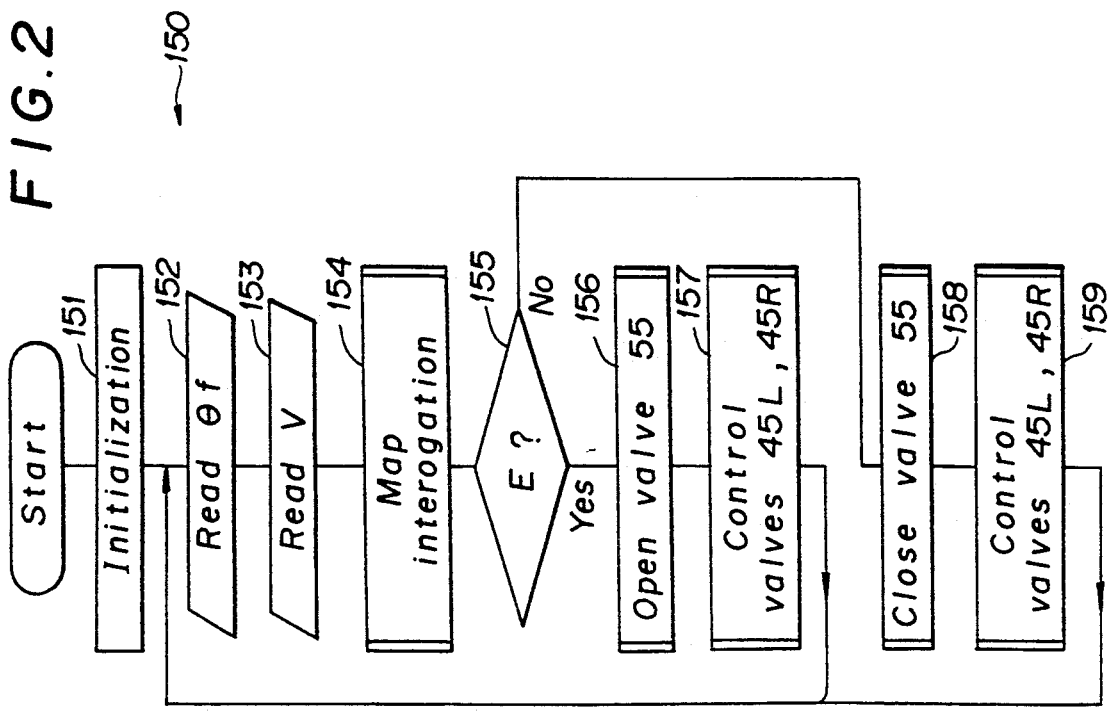
FIG. 2 is a flowchart of a control sequence to be executed by a computer in the drive power distribution control apparatus shown in FIG. 1.

FIG. 2 shows a control sequence 150 to be executed by the computer 51.

When the ignition switch on the motor vehicle is turned on, the electric power supply of the computer 51 is turned on to start the control sequence. The elements of the computer 51, such as interfaces, are initialized in a step 151.

Then, the front wheel steered angle θf and the vehicle speed V are read from the sensor unit 53 in respective steps 152, 153.

Figure 3:
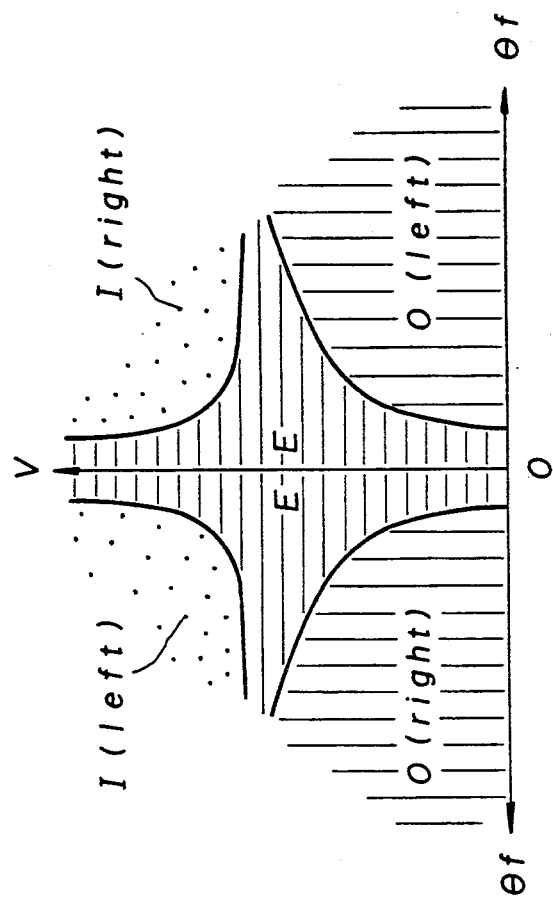
FIG. 3 is a diagram showing a control map used in the control sequence shown in FIG. 2.

In a step 154, a control map shown in FIG. 3 is searched for control conditions for the valve mechanism 55 and the pressure regulating valves 45L, 45R based on the front wheel steered angle θf and the vehicle speed V. The control map of FIG. 3 includes regions E in which equal hydraulic pressures are to be applied to the cylinders 17, 27 of the torque transmission clutches 11, 21, regions O in which more drive power is to be applied to the outer drive wheel with respect to a turning circle, and regions I in which more drive power is to be applied to the inner drive wheel with respect to a turning circle. Each of the regions O, I is actually divided into smaller segments.

A step 155 then determines whether regions found in the step 154 are E or not. If they are E, then control goes to a step 156, and if not, then control goes to a step 158.

In the step 156, the solenoid 59 of the valve mechanism 55 is de-energized, thus opening the bypass oil passage 49. Then, the solenoids 46L, 46R of the pressure regulating valves 45L, 45R are controlled in a step 157 in order to supply equal hydraulic pressures to the regulated pressure passages 47L, 47R. After the step 157, control returns to the step 152.

In the step 158, the solenoid 59 of the valve mechanism 55 is energized, thus closing the bypass oil passage 49. In a next step 159, the pressure regulating valves 45L, 45R are individually controlled based on the control conditions or regions (I or O) found in the step 154. After the step 159, control goes back to the step 152.

Figure 4:
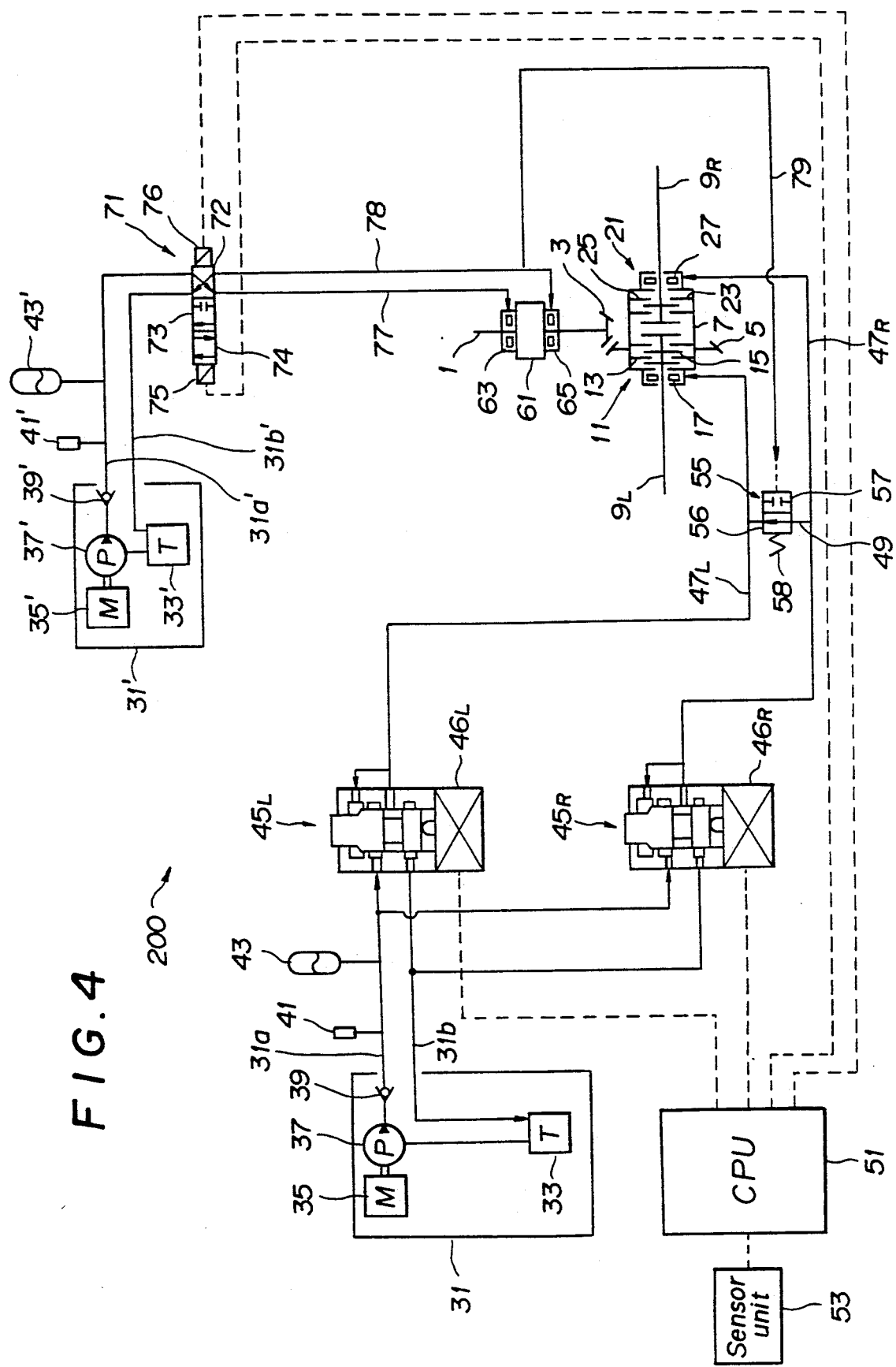
FIG. 4 is a circuit diagram of a hydraulic pressure system of a drive power distribution control apparatus according to a second embodiment of the present invention.

FIG. 4 shows a drive power distribution control apparatus 200 according to a second embodiment of the present invention. Those parts of the drive power distribution control apparatus 200 which are identical to those shown in FIG. 1 are denoted by identical reference characters, and will not be described in detail.

The drive power distribution control apparatus 200 is mounted on a four-wheel-drive motor vehicle in which all of two front wheels and two rear wheels are drivable. The propeller shaft 1 for a rear-wheel-drive system has a front or upper end connected to a front-wheel-drive system (not shown), and includes a transmission 61 capable of increasing the rotational speed of an input shaft thereof. Therefore, the transmission 61 is disposed in a power transmission path between the front wheel drive system and the rear wheel drive system.

The transmission 61 has a direct-connecting clutch 63 and a speed-increasing clutch 65.

When the direct-connecting clutch 63 is engaged and the speed-increasing clutch 65 is disengaged, the front and rear wheels are directly coupled by the transmission 61 so that they rotate at an equal speed. Conversely, when the direct-connecting clutch 63 is disengaged and the speed-increasing clutch 65 is engaged, the rotational speed of the rear wheels is higher than the rotational speed of the front wheels.

The direct-connecting clutch 63 and the speed-increasing clutch 65 are supplied with a hydraulic pressure from a hydraulic pressure source 31' which is separate from the hydraulic pressure source 31 for the torque transmission clutches 11, 21. The hydraulic pressure source 31' comprises a tank 33', a motor 35' drivable by the engine on the motor vehicle, a pump 37' actuatable by the motor 35' for supplying oil from the tank 33', and a check valve 39' for allowing oil to flow only from the pump 37'. The hydraulic pressure source 31' has an output line 31a' and a return oil passage 31b' which can selectively be connected to pressure supply passages 77, 78 coupled to the direct-connecting clutch 63 and the speed-increasing clutch 65 by a three-position directional control valve mechanism 71. A hydraulic pressure switch 41' and an accumulator 43' are connected to the output line 31a'.

The three-position directional control valve mechanism 71 has a valve comprising three different shiftable members 72, 73, 74, and two solenoids 75, 76 on the opposite ends of the valve which are controllable by the computer 51.

The transmission 61 is shown at an enlarged scale in FIG. 5. The transmission 61 is supported on a vehicle body 68 and includes a speed-increasing mechanism 66. The propeller shaft 1 serves as an input shaft of the transmission 61, whereas the lower end 1a of the propeller shaft 1 serves as an output shaft of the transmission 61. The bevel gear 3 is mounted on the rear end (not shown) of the output shaft 1a.

The direct-connecting clutch 63 is disposed between the input shaft 1 and the output shaft 1a. The direct-connecting clutch 63 comprises a hydraulically operated multiple-disc clutch having a plurality of outer plates 63b fixedly mounted in a drum 63a integral with the input shaft 1 and a plurality of inner plates 63c fixedly mounted on the output shaft 1a, the outer and inner plates 63b, 63c interleaving with each other.

The speed-increasing mechanism 66 is disposed between the clutch drum 63a and the output shaft 1a. The speed-increasing mechanism 66 is in the form of a planetary gear mechanism which comprises an internal gear (ring gear) 66a on an circumferential edge of the clutch drum 63a, a plurality of smaller-diameter planet gears 66b meshing with the internal gear 66a, a plurality of larger-diameter planet gears 66c integrally and concentrically connected to the respective smaller-diameter planet gears 66b through connecting shafts 66e, and an internal gear (ring gear) 66d fixedly mounted on the output shaft 1a and held in mesh with the larger-diameter planet gears 66c.

The connecting shafts 66e between the planet gears 66b, 66c are rotatably supported by a carrier 66f, with the speed-increasing clutch 65 being disposed between the carrier 66f and the vehicle body 68. The speed-increasing clutch 65 also comprises a hydraulically operated multiple-disc clutch having a plurality of outer plates 65a fixed to the vehicle body 68 and a plurality of inner plates 65b fixed to the carrier 66f and interleaving with the outer plates 65a.

It is assumed that the internal gear 66a has N1 gear teeth, the smaller-diameter planet gears 66b have N2 gear teeth, the larger-diameter planet gears 66c have N3 gear teeth, and the internal gear 66d has N4 gear teeth. The numbers of these gear teeth are selected to meet the following relationship:

$$\frac{N1}{N2} \cdot \frac{N3}{N4} > 1.0 \qquad (1)$$

As described above, the pressure supply passages 77, 78 are connected respectively to the direct-connecting clutch 63 and the speed-increasing clutch 65.

When the direct-connecting clutch 63 is engaged and the speed-increasing clutch 65 is disengaged, the torque from the input shaft 1 is transmitted directly to the output shaft 1a through the engaged direct-connecting clutch 63. Since the speed-increasing clutch 65 is disengaged, the speed-increasing mechanism 66 rotates with the shafts 1, 1a. Thus, the rotational speed $\omega'$ of the output shaft 1a is equal to the rotational speed $\omega$ of the input shaft 1 ($\omega' = \omega$).

Conversely, when the direct-connecting clutch 63 is disengaged and the speed-increasing clutch 65 is engaged, the torque from the input shaft 1 is transmitted to the output shaft 1a through the internal gear 66a, the smaller-diameter planet gears 66b, the larger-diameter planet gears 66c, and the internal gear 66d. At this time, the carrier 66 is fixed with respect to the vehicle body 68. The rotational speed $\omega'$ of the output shaft 1a and the rotational speed $\omega$ of the input shaft 1 are related to each other as follows:

$$\omega' = \frac{N1}{N2} \cdot \frac{N3}{N4} \cdot \omega \qquad (2)$$

Hence, $$\frac{\omega'}{\omega} = \frac{N1}{N2} \cdot \frac{N3}{N4} \qquad (2')$$

From the equations (2') and (1), we get $$\frac{\omega'}{\omega} > 1.0$$

Hence, $\omega' > \omega$. When the direct-connecting clutch 63 is disengaged and the speed-increasing clutch 65 is engaged, therefore, the rotational speed $\omega'$ of the output shaft 1a is higher than the rotational speed $\omega$ of the input shaft 1.

When the motor vehicle is running straight ahead, the solenoids 75, 76 are controlled by the computer 51 such that the shiftable member 72 is in the operating position as shown in FIG. 4. Under this condition, the output line 31a' of the hydraulic pressure source 31' is connected to the pressure supply passage 77 of the direct-connecting clutch 63, and the pressure supply passage 78 of the speed-increasing clutch 65 is connected to the return oil passage 31b'. Therefore, the direct-connecting clutch 63 is energized and the speed-increasing clutch 65 is disengaged, so that the front and rear wheels are directly connected to each other.

When the motor vehicle is making a turn, the solenoids 75, 76 are controlled by the computer 51 such that the transition shiftable member 73 is temporarily held in registry with the oil passages 77, 78 for a short period of time to release oil under pressure from the direct-connecting clutch 63, and thereafter the shiftable member 74 is brought into registry with the oil passages 77, 78. With the valve mechanism 71 thus shifted, the output line 31a' of the hydraulic pressure source 31' is connected to the pressure supply passage 78 of the speed-increasing clutch 65, whereas the pressure supply passage 77 of the direct-connecting clutch 63 is connected to the return passage 31b'. Therefore, the speed-increasing clutch 65 is engaged, and the direct-connecting clutch 63 is disengaged. Thereafter, the solenoids 75, 76 are controlled by the computer 51 such that the transition shiftable member 73 is held in registry with the passages 77, 78 again. The rear wheels are thus kept at an increased speed.

A pilot oil passage 79 is branched from the pressure supply passage 78 and connected to the shut-off valve mechanism 55 on the bypass oil passage 49 between the regulated pressure passages 47L, 47R. A pilot pressure in the pilot oil passage 79 is used instead of the solenoid 57 shown in FIG. 1. When the pilot pressure is applied to the shut-off valve mechanism 55 during a turn of the motor vehicle, it closes the bypass oil passage 49 to disconnect the regulated pressure passages 47L, 47R. When the pilot pressure is released, the valve mechanism 55 opens the bypass oil passage 49 which then brings the regulated pressure passages 47L, 47R into communication with each other.

If the solenoid 59 (FIG. 1) of the valve mechanism 55 is replaced with a spring for normally urging the valve of the valve mechanism 55 to close the bypass oil passage 49, then the pressure in the pressure supply passage 77 may be used as a pilot pressure to shift the valve of the valve mechanism 55 to open the bypass oil passage 49.

The drive power distribution control apparatus of the present invention has been shown as being incorporated in the rear-wheel-drive system of a rear-wheel-drive motor vehicle or a four-wheel-drive motor vehicle. However, it may also be incorporated in the front-wheel-drive system of a front-wheel-drive motor vehicle or a four-wheel-drive motor vehicle.

The drive power distribution control apparatus is effective in simplifying the controlling of the motor vehicle to run straight ahead, and also in providing fail-safe operation of the motor vehicle.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An apparatus for controlling the distribution of drive power in a motor vehicle having a torque transmission device which transmits power from a power source to a pair of drive wheels through respective torque transmission clutches capable of varying torques transmitted therethrough, said apparatus comprising:
   a pair of pressure regulating valves;
   a pair of regulated pressure passages extending from said pressure regulating valves, respectively, to the torque transmission clutches; and
   shut-off valve means disposed between said regulated pressure passages for selectively bringing the regulated pressure passages into and out of communication with each other wherein said shut-off valve means brings said regulated pressure passages into communication with each other when the motor vehicle is running straight, and brings said regulated pressure passages out of communication with each other when the motor vehicle is making a turn.

2. An apparatus according to claim 1, wherein each of said torque transmission clutches comprises a hydraulically operated multi-disc clutch which comprises a plurality of driving plates driven by said power source, a plurality of driven plates connected to each of said pair of drive wheels, and a hydraulic cylinder for applying a hydraulic pressure to press said driving plates and said driven plates against each other, said hydraulic pressure being a regulated pressure from each of said pair of regulated pressure passages.

3. An apparatus according to claim 1, wherein each of the torque transmission clutches increases a ratio of torque transmission from the power source to an associated drive wheel as the regulated pressure from an associated pressure regulating valve increases.

4. An apparatus for controlling the distribution of drive power in a motor vehicle having at least one righthand drive wheel, at least one lefthand drive wheel, a power source, and a hydraulically operated torque transmission device for applying drive power from said power source to the righthand and lefthand drive wheels, said hydraulically operated torque transmission device having a first hydraulically operated torque transmission clutch for transmitting drive power from the power source to the lefthand drive wheel, a first hydraulic cylinder for controlling the rate at which the torque is transmitted by said first torque transmission clutch, a second hydraulically operated torque transmission clutch for transmitting drive power from the power source to the righthand drive wheel, and a second hydraulic cylinder for controlling the rate at which the torque is transmitted by said second torque transmission clutch, said apparatus comprising:
   a hydraulic pressure source;
   first and second pressure regulating valves for independently receiving oil under pressure from said hydraulic pressure source;
   a first regulated pressure passage for supplying oil pressure regulated by said first pressure regulating valve to said first hydraulic cylinder of said first torque transmission clutch, said first regulated pressure passage interconnecting said first pressure regulating valve and said first hydraulic cylinder;
   a second regulated pressure passage for supplying oil pressure regulated by said second pressure regulating valve to said second hydraulic cylinder of said second torque transmission clutch, said second regulated pressure passage interconnecting said second pressure regulating valve and said second hydraulic cylinder;
   a bypass oil passage interconnecting said first and second regulated pressure passages;
   a shut-off valve mechanism disposed in said bypass oil passage for selectively opening and closing the bypass oil passage;
   control means for controlling said first and second pressure regulating valves and said shut-off valve mechanism; and means for detecting straight-running and turning conditions of the motor vehicle, said control means including means responsive to detected signals from said detecting means, for controlling said shut-off valve mechanism to open said bypass oil passage to equalize the regulated hydraulic pressures in said first and second regulated pressure passages when the motor vehicle is running straight, and for controlling said shut-off valve mechanism to close said bypass oil passage when the motor vehicle is making a turn.

5. An apparatus according to claim 4, wherein each of said first and second torque transmission clutches comprises a hydraulically operated multi-disc clutch which comprises a plurality of driving plates driven by said power source, a plurality of driven plates connected to each of said drive wheels and each of said first and second hydraulic cylinders, each of said first and second hydraulic cylinders applying said regulated oil pressure to press the associated driving plates and driven plates against each other.

6. An apparatus according to claim 4, wherein each of the torque transmission clutches increases a ratio of torque transmission from the power source to an associated drive wheel as the regulated pressure from an associated pressure regulating valve increases.

7. An apparatus for controlling the distribution of drive power in a passenger motor vehicle having a torque transmission device which transmits power from a power source to a pair of drive wheels through respective torque transmission clutches capable of varying torques transmitted therethrough, said apparatus comprising:

a pair of pressure regulating valves;

a pair of regulated pressure passages extending from said pressure regulating valves, respectively, to the torque transmission clutches; and shut-off valve means disposed between said regulated pressure passages for equalizing pressure between said regulated pressure passages by selectively bringing the regulated pressure passages into and out of communication with each other, said shut-off valve means bringing said regulated pressure passages into communication with each other when the motor vehicle is running straight, and bringing said regulated pressure passages out of communication with each other when the motor vehicle is making a turn.

* * * * *